United States Patent
Kim et al.

(10) Patent No.: US 9,322,485 B2
(45) Date of Patent: Apr. 26, 2016

(54) VALVE MEMBRANE AND CHECK VALVE

(71) Applicant: Samsung Electro-Mechanics Co., Ltd., Suwon-si, Gyeonggi-do (KR)

(72) Inventors: Sang Jin Kim, Gyunggi-do (KR); Bo Sung Ku, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 260 days.

(21) Appl. No.: 13/779,267

(22) Filed: Feb. 27, 2013

(65) Prior Publication Data

US 2014/0130921 A1    May 15, 2014

(30) Foreign Application Priority Data

Nov. 12, 2012   (KR) ................ 10-2012-0127217

(51) Int. Cl.
*F16K 15/00*   (2006.01)
*F16K 17/18*   (2006.01)
*F16K 15/14*   (2006.01)

(52) U.S. Cl.
CPC ............ *F16K 17/18* (2013.01); *F16K 15/147* (2013.01); *Y10T 137/7888* (2015.04)

(58) Field of Classification Search
CPC ............ A61M 2039/2426; A61M 2039/244; F16K 15/144; F16K 15/147; F16K 17/18
USPC ............... 137/493.8, 493.9, 512.4, 852
See application file for complete search history.

(56) References Cited

U.S. PATENT DOCUMENTS

| | | | | |
|---|---|---|---|---|
| 3,788,071 | A | * | 1/1974 | Brewer ................. 60/293 |
| 4,186,768 | A | * | 2/1980 | Kuester ............. 137/516.25 |
| 6,193,214 | B1 | * | 2/2001 | Schatz ................... 251/305 |
| 2008/0196779 | A1 | * | 8/2008 | Freeman et al. ....... 137/852 |
| 2010/0263743 | A1 | * | 10/2010 | Lefler et al. ........... 137/527 |

FOREIGN PATENT DOCUMENTS

| | | |
|---|---|---|
| JP | 2012-112419 A | 6/2012 |
| KR | 2007-0045554 A | 5/2007 |

\* cited by examiner

*Primary Examiner* — John K Fristoe, Jr.
*Assistant Examiner* — Reinaldo Sanchez-Medina
(74) *Attorney, Agent, or Firm* — NSIP Law

(57) ABSTRACT

There is provided a valve membrane including: a thin film member; a first opening and closing member formed by a first cutting line to cut one part of the thin film member and opened by a fluid moving in a first direction; and a second opening and closing member formed by a second cutting line to cut the other part of the thin film member and opened by a fluid moving in a second direction.

15 Claims, 9 Drawing Sheets

A-A

B-B

VALVE MEMBRANE AND CHECK VALVE

CROSS-REFERENCE TO RELATED APPLICATIONS

This application claims the priority of Korean Patent Application No. 10-2012-0127217 filed on Nov. 12, 2012, in the Korean Intellectual Property Office, the disclosure of which is incorporated herein by reference.

BACKGROUND OF THE INVENTION

1. Field of the Invention

The present invention relates to a valve membrane and a check valve including the same, and more particularly, to a valve membrane and a check valve able to be mounted on a pipe through which a small amount of fluid is transported.

2. Description of the Related Art

Observation of a reaction between new drugs and a cell is required for developing new drugs and testing the stability thereof. In general, a reaction test between a drug and a cell is performed by using a culture dish, or the like.

However, since a reaction between a drug and a cell, occurring in the culture dish, is significantly different from a reaction between the drug and the cell, occurring inside a body, it may be difficult to accurately observe or examine a reaction between a drug and a cell only through a result of the test using the culture dish. Therefore, development of a new device that can observe the reaction between the drug and the cell in a similar environment to that of a body is required.

To this end, the applicant has developed a technology of circulating a culture medium. However, since a small amount of culture medium needs to be constantly supplied, for smoothly culturing the cell, development of a small-sized valve that can control a supply amount and a supply speed of the culture medium is required.

For reference, as the related art associated with the small-sized valve, Patent Documents 1 and 2 are provided. However, in Patent Document 1, since an opening and closing unit 102 is fixed by a fixation unit 101 by a connection unit 103, it is difficult to control an irregular fluid flow state. That is, in Patent Document 1, in the irregular fluid flow state (particularly, a pulsating phenomenon), the opening and closing unit 102 may vibrate significantly according to a flow direction of the fluid.

Unlike this, in Patent Document 2, since a valve is opened and closed by expansion and contraction of a slope hole 5, the supply of the fluid can be minutely controlled. However, in Patent Document 2, since the supply amount of the fluid is limited by the size of the slope hole 5, there is a substantial limit in constantly supplying a small amount of fluid.

RELATED ART DOCUMENT (Patent Document 1) KR2007-045554 A
(Patent Document 2) JP2012-112419 A

SUMMARY OF THE INVENTION

An aspect of the present invention provides a valve membrane and a check valve, capable of having a simple structure and minutely controlling fluid supply.

According to an aspect of the present invention, there is provided a valve membrane including: a thin film member; a first opening and closing member formed by a first cutting line to cut one part of the thin film member and opened by a fluid moving in a first direction; and a second opening and closing member formed by a second cutting line to cut the other part of the thin film member and opened by a fluid moving in a second direction.

The first cutting line may have a length greater than that of the second cutting line.

The first cutting line may be curved to have a first radius, and the second cutting line may be curved to have a second radius.

The first radius and the second radius may have different sizes.

Both ends of the first cutting line and both ends of the second cutting line may be positioned on the same extension line.

The valve membrane may further include third cutting lines respectively extending from both ends of the first cutting line toward both ends of the second cutting line.

The valve membrane may further include: third cutting lines respectively extending inwardly from both ends of the first cutting line; and fourth cutting lines respectively extending outwardly from both ends of the second cutting line.

The third cutting lines and the fourth cutting lines may be formed to be parallel.

An area of the first opening and closing member may be larger than that of the second opening and closing member.

The valve membrane may further include a first groove formed in a first surface of the thin film member and connecting both ends of the first cutting line to each other; and a second groove formed in a second surface of the thin film member and connecting both ends of the second cutting line to each other.

The thin film member may be formed of an elastic material.

According to another aspect of the present invention, there is provided a check valve, including: a first valve body; a second valve body; and a valve membrane including a first opening and closing member and a second opening and closing member having different areas.

The valve membrane may include: a thin film member; a first opening and closing member formed by a first cutting line to cut one part of the thin film member and opened by a fluid moving in a first direction; and a second opening and closing member formed by a second cutting line to cut the other part of the thin film member and opened by a fluid moving in a second direction.

The first cutting line may have a length greater than that of the second cutting line.

The first cutting line may be curved to have a first radius, and the second cutting line may be curved to have a second radius.

The first radius and the second radius may have different sizes.

Both ends of the first cutting line and both ends of the second cutting line may be positioned on the same extension line.

The check valve may further include third cutting lines respectively extending from both ends of the first cutting line toward both ends of the second cutting line.

The check valve may further include: third cutting lines respectively extending inwardly from both ends of the first cutting line; and fourth cutting lines respectively extending outwardly from both ends of the second cutting line.

The third cutting lines and the fourth cutting lines may be formed to be parallel.

An area of the first opening and closing member may be larger than that of the second opening and closing member.

The check valve may further include a first groove formed in a first surface of the thin film member and connecting both ends of the first cutting line to each other; and a second groove formed in a second surface of the thin film member and connecting both ends of the second cutting line to each other.

The thin film member may be formed of an elastic material.

The first valve body may be provided with a first through-hole including a semicircle having a third radius and a semicircle having a fourth radius, and the second valve body may be provided with a second through-hole including a semicircle having a fifth radius and a semicircle having a sixth radius.

The second radius may be smaller than the first radius, the third radius may be larger than the first radius, the fourth radius may be smaller than the second radius, the fifth radius may be smaller than the first radius but larger than the second radius, and the sixth radius may be smaller than the first radius but larger than the second radius.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
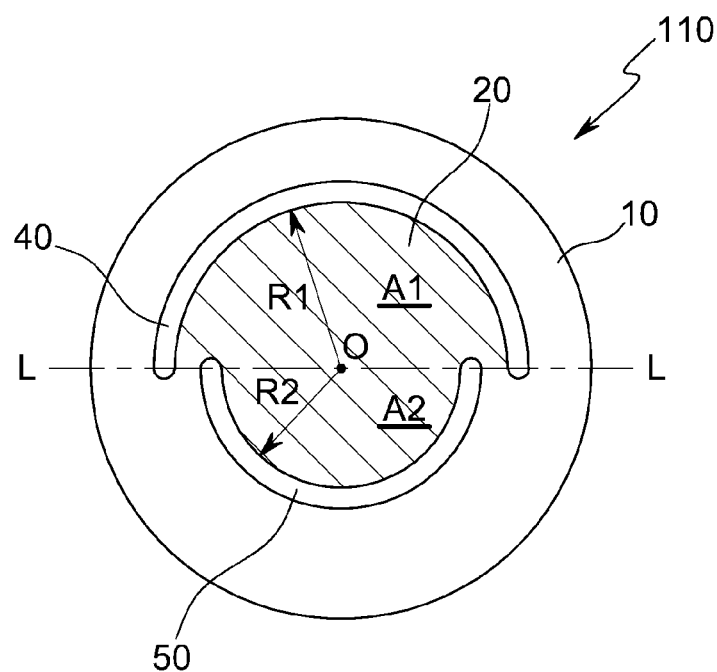
FIG. 1 is a plan view of a valve membrane according to a first embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
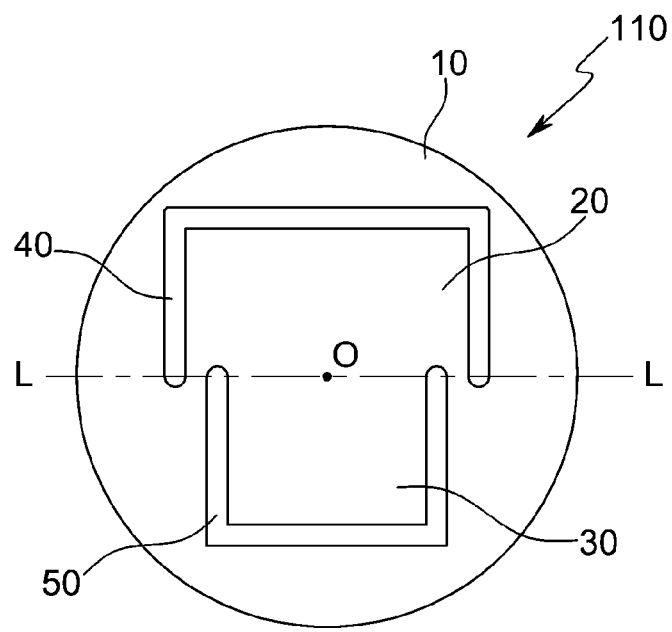
FIGS. 2 and 3 are diagrams illustrating other shapes of the valve membrane illustrated in FIG. 1.
Figure 3:
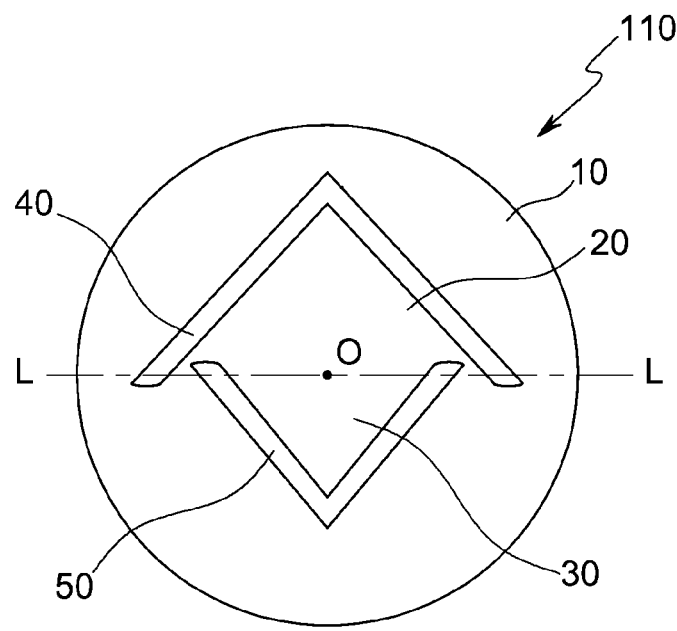
Figure 4:
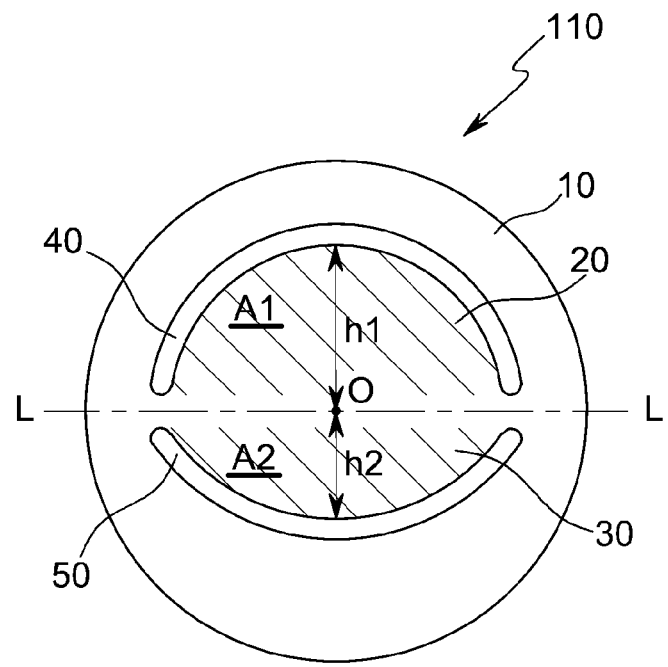
FIG. 4 is a plan view of a valve membrane according to a second embodiment of the present invention.
Figure 5:
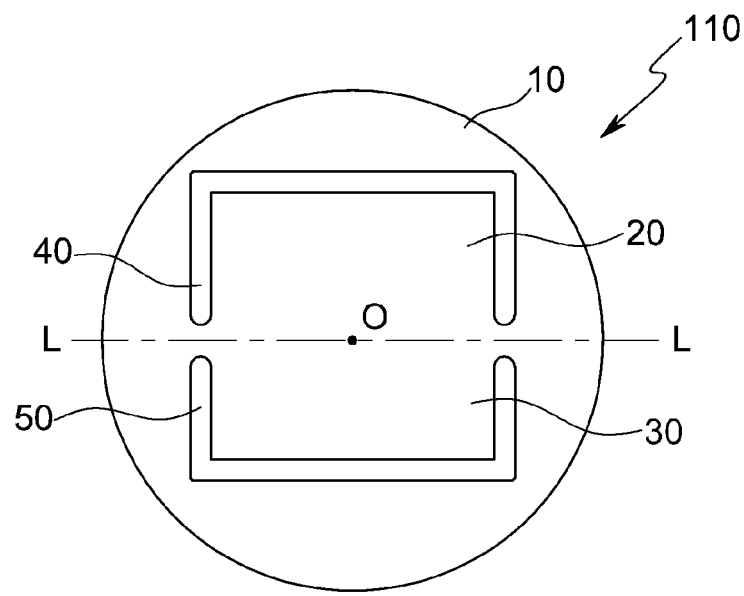
FIGS. 5 and 6 are diagrams illustrating other shapes of the valve membrane illustrated in FIG. 4.
Figure 6:
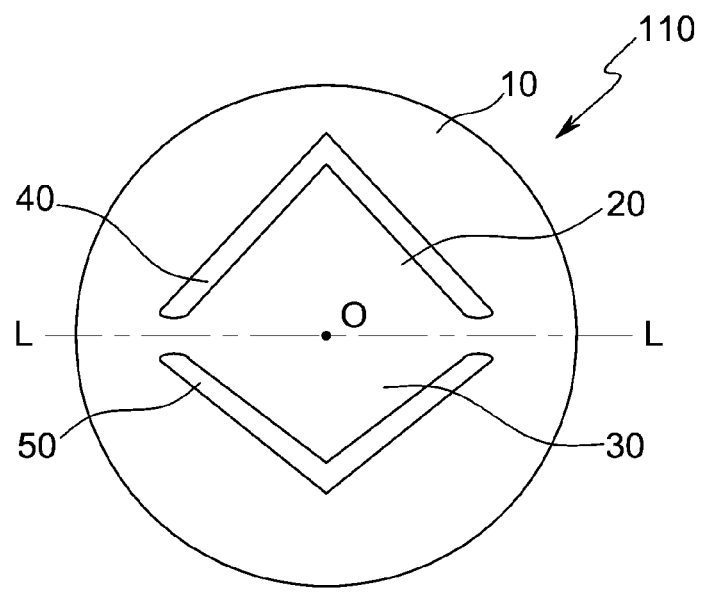
Figure 7:
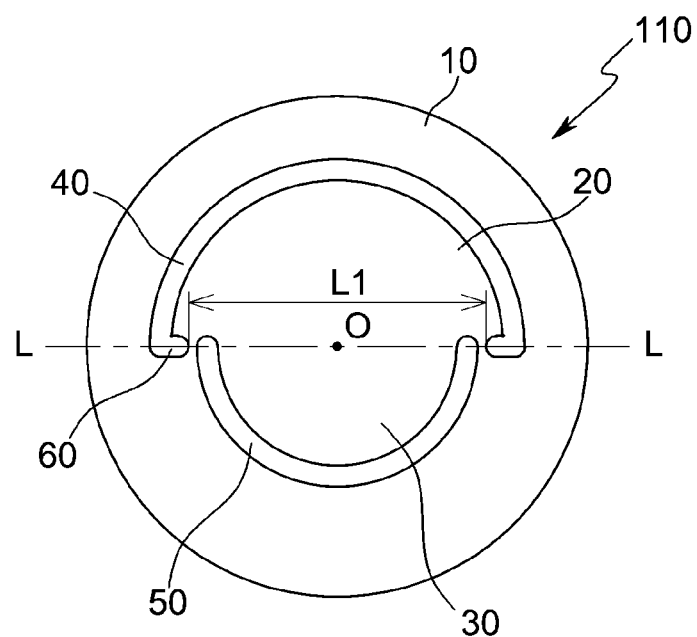
FIG. 7 is a plan view of a valve membrane according to a third embodiment of the present invention.
Figure 8:
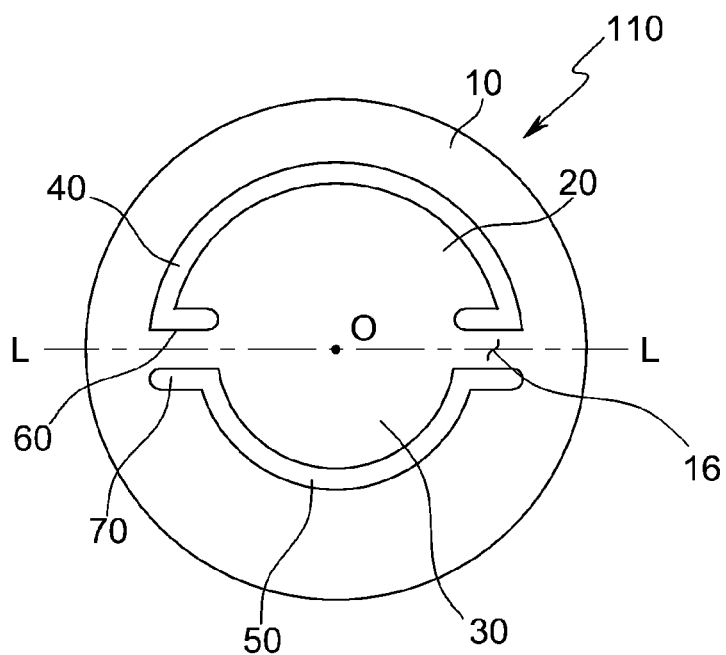
FIG. 8 is a plan view of a valve membrane according to a fourth embodiment of the present invention.
Figure 9:
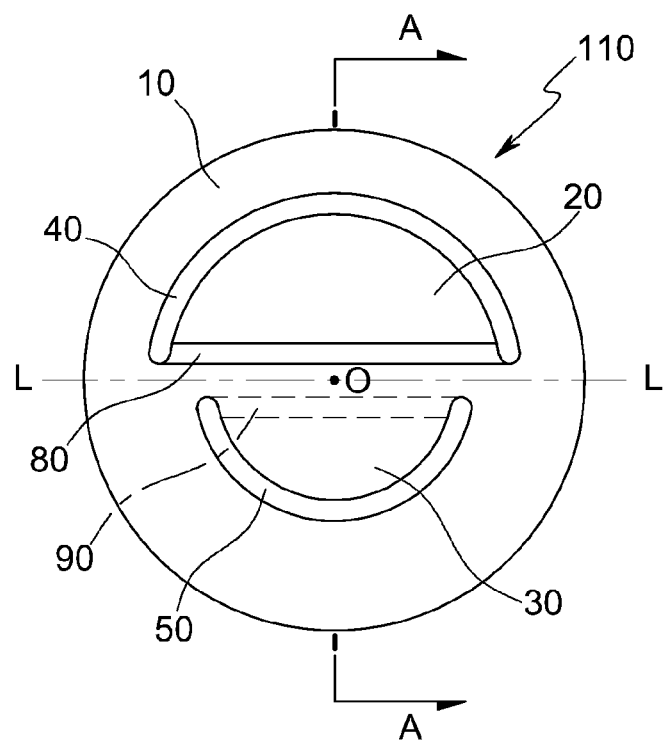
FIG. 9 is a plan view of a valve membrane according to a fifth embodiment of the present invention.
Figure 10:
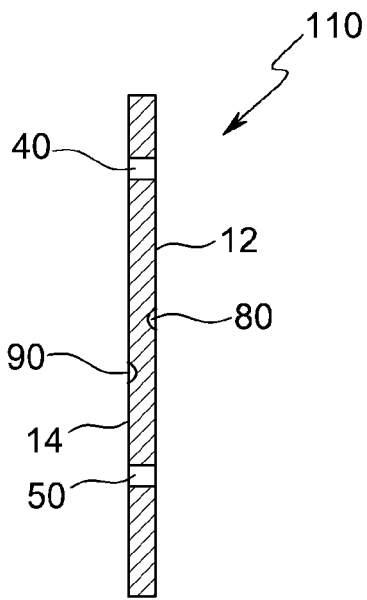
FIG. 10 is a cross-sectional view of the valve membrane illustrated in FIG. 9 taken along line A-A.
Figure 11:
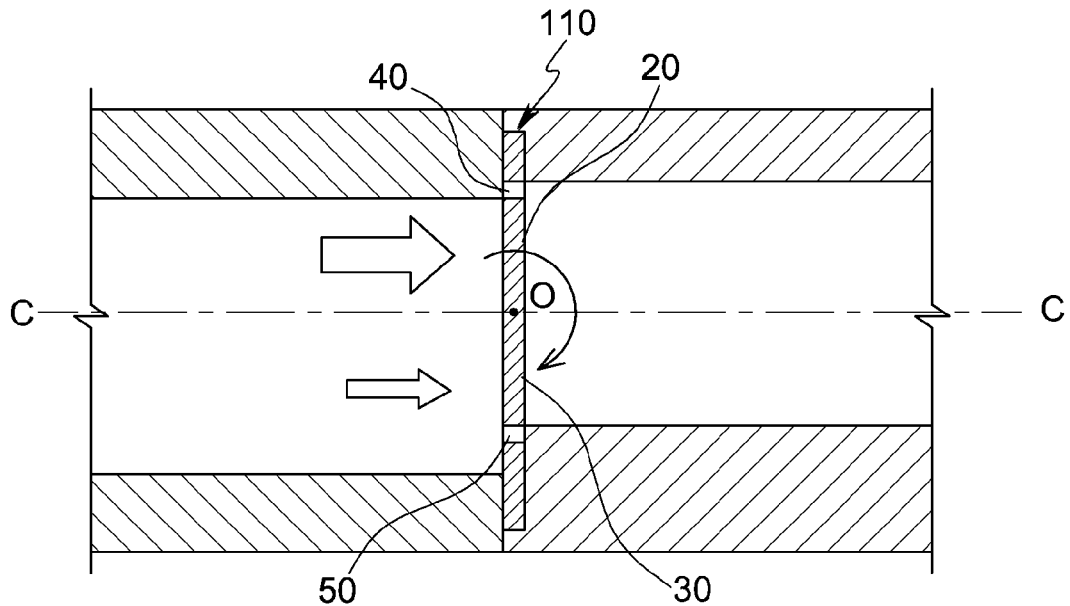
FIGS. 11 and 12 are installation cross-sectional views of the valve membrane for describing an opening and closing principle of the present invention.
Figure 12:
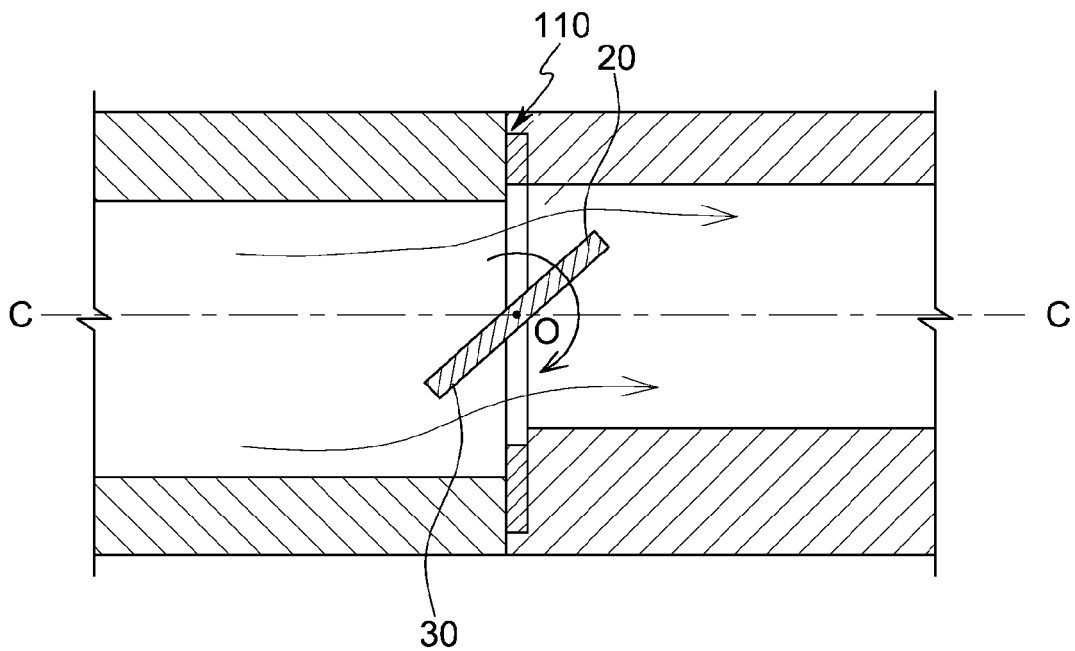
Figure 13:
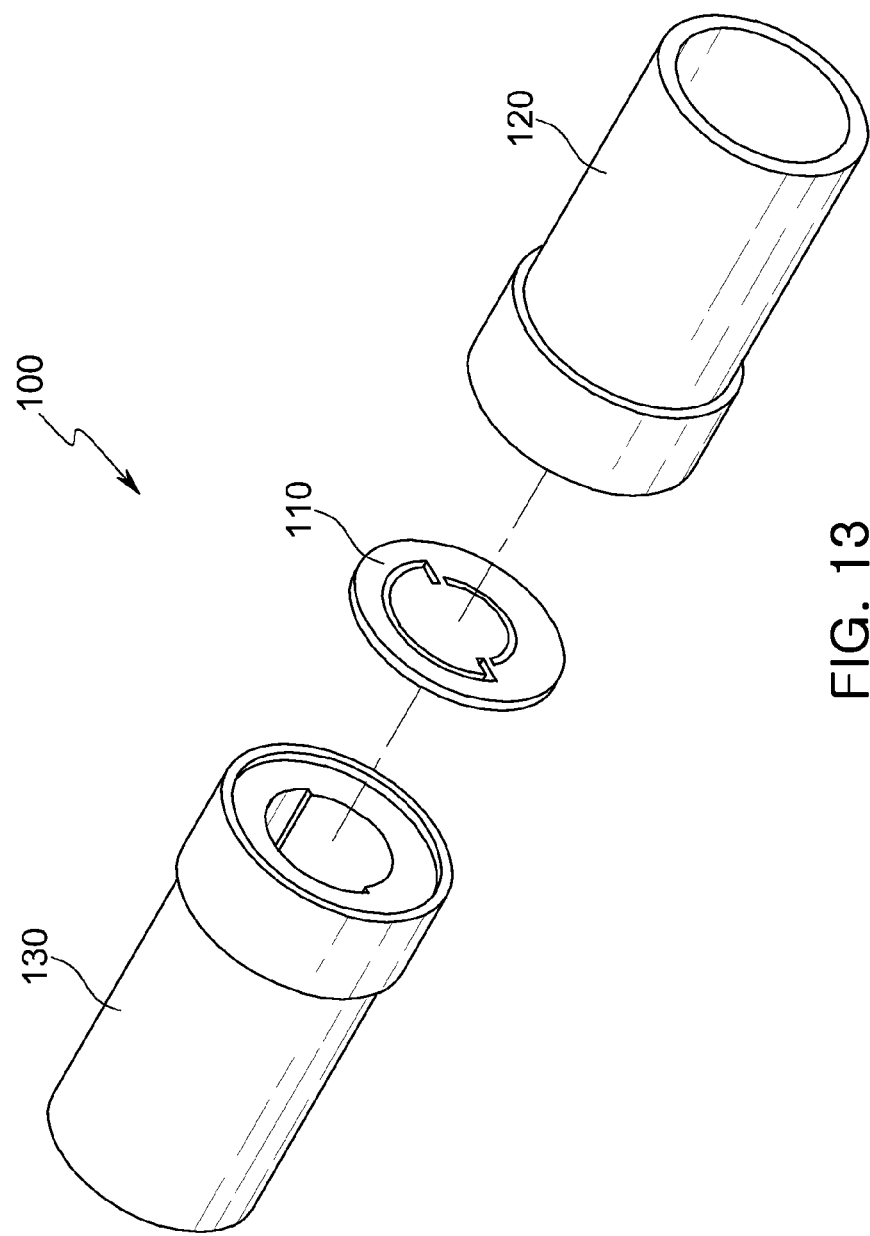
FIG. 13 is an exploded perspective view of a check valve according to an embodiment of the present invention.
Figure 14:
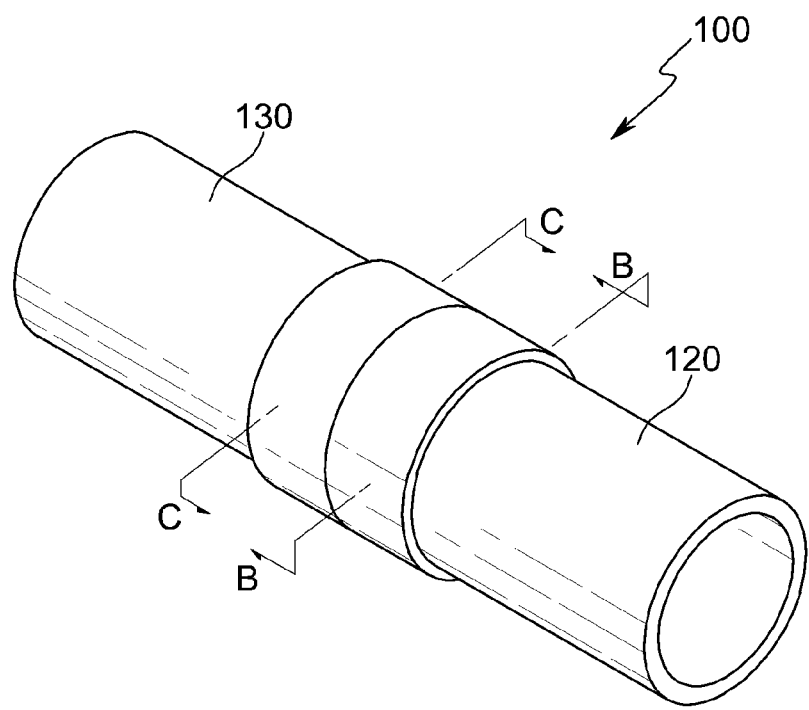
FIG. 14 is a combination diagram of the check valve illustrated in FIG. 13.
Figure 15:
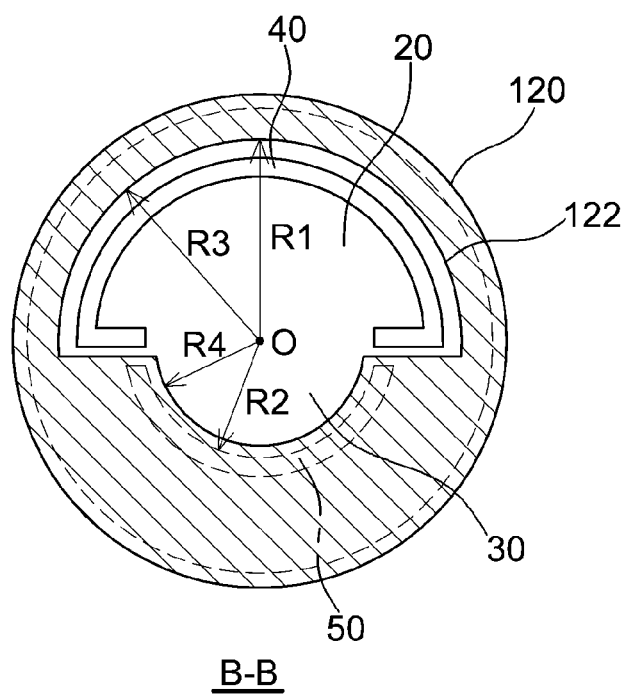
FIG. 15 is a cross-sectional view of the check valve illustrated in FIG. 13 taken along line B-B.
Figure 16:
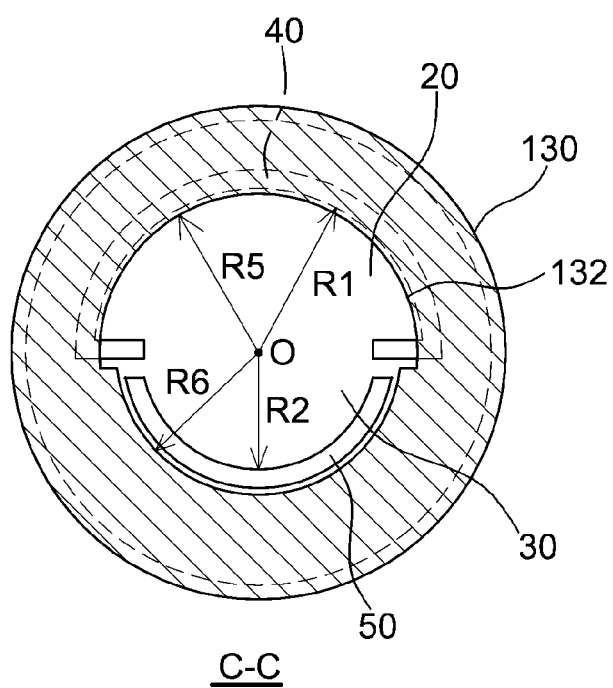
FIG. 16 is a cross-sectional view of the check valve illustrated in FIG. 13 taken along line C-C.

FIG. 1 is a plan view of a valve membrane according to a first embodiment of the present invention. FIGS. 2 and 3 are diagrams illustrating other shapes of the valve membrane illustrated in FIG. 1. FIG. 4 is a plan view of a valve membrane according to a second embodiment of the present invention. FIGS. 5 and 6 are diagrams illustrating other shapes of the valve membrane illustrated in FIG. 4. FIG. 7 is a plan view of a valve membrane according to a third embodiment of the present invention. FIG. 8 is a plan view of a valve membrane according to a fourth embodiment of the present invention. FIG. 9 is a plan view of a valve membrane according to a fifth embodiment of the present invention. FIG. 10 is a cross-sectional view of the valve membrane illustrated in FIG. 9. FIGS. 11 and 12 are installation cross-sectional views of the valve membrane for describing an opening/closing principle of the present invention. FIG. 13 is an exploded perspective view of a check valve according to an embodiment of the present invention. FIG. 14 is a combination diagram of the check valve illustrated in FIG. 13. FIG. 15 is a cross-sectional view of the check valve illustrated in FIG. 13 taken along line B-B. FIG. 16 is a cross-sectional view of the check valve illustrated in FIG. 13 taken along line C-C.

The valve membrane according to the first embodiment of the present invention will be described with reference to FIGS. 1 through 3.

A valve membrane 110 according to the first embodiment may include a thin film member 10, a first opening and closing member 20, and a second opening and closing member 30. Here, the thin film member 10 may be integrated with the first opening and closing member 20 and the second opening and closing member 30. Further, the first opening and closing member 20 and the second opening and closing member 30 may be formed by processing the thin film member 10.

The thin film member 10 may be a membrane having a circular cross-section. However, a cross-sectional shape of the thin film member 10 is not limited to a circular shape. For example, the thin film member 10 may have a polygonal cross-section, including a rectangular cross-section.

The thin film member 10 may be formed of an elastic material. When further explained, the thin film member 10 may be formed of a material which may be bent or deformed when a predetermined degree of force is applied thereto. For example, the thin film member 10 may be formed of a material such as plastic or rubber, or a synthetic resin or metal. However, the material of the thin film member 10 is not limited to the aforementioned materials and the thin film member 10 may be manufactured by any material having a predetermined degree of elastic force.

The first opening and closing member 20 may be formed in one part of the thin film member 10. When further explained, the first opening and closing member 20 may be formed in an upper part of the thin film member 10 by a first cutting line 40. Herein, the first cutting line 40 may be curved to have a first radius R1. In this case, the first opening and closing member 20 may have a substantially semicircular shape. However, the shapes of the first opening and closing member 20 and the first cutting line 40 are not limited to shapes illustrated in FIG. 1. For example, the first opening and closing member 20 may have a rectangular or triangular shape as illustrated in FIGS. 2 and 3, and the first cutting line 40 may be formed as a plurality of straight lines rather than as a curve.

The first opening and closing member 20 may be opened and closed based on a horizontal line segment L-L. For example, the first opening and closing member 20 may rotate about the horizontal line segment L-L as a central axis. Herein, a rotational direction of the first opening and closing member 20 may depend on an installation position of the valve membrane 110.

The second opening and closing member 30 may be formed in the other part of the thin film member 10. When further explained, the second opening and closing member 30 may be formed in a lower part of the thin film member 10 by a second cutting line 50. Herein, the second cutting line 50 may be curved to have a second radius R2. In this case, the second opening and closing member 30 may have a substantially semicircular shape. However, the shapes of the second opening and closing member 30 and the second cutting line 50 are not limited to shapes illustrated in FIG. 1. For example, the second opening and closing member 30 may have the rectangular or triangular shape as illustrated in FIGS. 2 and 3, and the second cutting line 50 may be formed as a plurality of straight lines rather than as a curve.

The second opening and closing member 30 may be opened and closed based on the horizontal line segment L-L in a similar manner to the case of the first opening and closing member 20. For example, the second opening and closing member 30 may rotate about the horizontal line segment L-L as a central axis. Herein, a rotational direction of the second opening and closing member 30 may be opposite to that of the first opening and closing member 20. For example, when the first opening and closing member 20 is opened forwardly, the second opening and closing member 30 is opened backwardly while when the first opening and closing member 20 is opened backwardly, the second opening and closing member 30 is opened forwardly (see FIG. 12).

The first opening and closing member 20 and the second opening and closing member 30 may respectively have predetermined areas. When further explained, the first opening and closing member 20 may have a first area A1 and the second opening and closing member 30 may have a second area A2. Herein, the first area A1 of the first opening and closing member 20 may be larger than the second area A2 of the second opening and closing member 30. To this end, the length of the first cutting line 40 may be greater than that of the second cutting line 50. Alternatively, the first radius R1 of the first cutting line 40 may be larger than the second radius R2 of the second cutting line 50.

As such, when the areas of the first opening and closing member 20 and the second opening and closing member 30 are different from each other, the magnitudes of force acting on the first opening and closing member 20 and the second opening and closing member 30 may be different from each other, which may cause the force to be concentrated on the first opening and closing member 20, such that the rotation (that is, opening) of the first opening and closing member 20 may be induced. Herein, since the first opening and closing member 20 and the second opening and closing member 30 are integrally formed to move together, the rotation of the first opening and closing member 20 may also induce the rotation of the second opening and closing member 30. Accordingly, according to the embodiment, the first opening and closing member 20 and the second opening and closing member 30 are opened or closed simultaneously to control the flow of a fluid.

Meanwhile, a difference in area between the first opening and closing member 20 and the second opening and closing member 30 may depend on a magnitude of the elastic force of the thin film member 10. For example, when the elastic force of the thin film member 10 is high, the difference in area between the first opening and closing member 20 and the second opening and closing member 30 may be increased and when the elastic force of the thin film member 10 is relatively low, the difference in area between the first opening and closing member 20 and the second opening and closing member 30 may be decreased. The reason for this is that the opening and closing members 20 and 30 may only rotate when force caused by the difference in area between the first opening and closing member 20 and the second opening and closing member 30 is larger than the elastic force of the thin film member 10.

For reference, in the embodiment, both ends of the first cutting line 40 and both ends of the second cutting line 50 may be positioned on the horizontal line segment L-L intersecting a center point O. In this case, since rotation reference points of the first opening and closing member 20 and the second opening and closing member 30 are positioned on the same line, the first opening and closing member 20 and the second opening and closing member 30 may smoothly rotate simultaneously.

In the valve membrane 110 configured as above, the sizes of the first opening and closing member 20 and the second opening and closing member 30 are set to be different from each other, and as a result, opening conditions of the opening and closing members 20 and 30 may be set. Therefore, even in a pipe through which a small amount of fluid moves, the flow of the fluid may be effectively controlled by controlling the difference in area between the first opening and closing member 20 and the second opening and closing member 30.

Next, a valve membrane according to a second embodiment of the present invention will be described with reference to FIGS. 4 through 6.

The valve membrane 110 according to the embodiment may be distinguished from that of the first embodiment in that heights from the center point O of the thin film member 10 to apexes of the cutting lines 40 and 50 are different from each other. That is, a height h1 from the center point O to the apex of the first cutting line 40 may be different from a height h2 from the center point O to the second cutting line 50.

This structure may naturally induce the difference in area between the first opening and closing member 20 and the second opening and closing member 30. Moreover, in this structure, since a portion in which the both ends of the first cutting line 40 and the second cutting line 50 are separated from each other serves as a rotational shaft, the first opening and closing member 20 and the second opening and closing member 30 may smoothly rotate.

Meanwhile, the shapes of the first opening and closing member 20 and the second opening and closing member 30 may be deformed as illustrated in FIGS. 5 and 6, and to this end, the first cutting line 40 and the second cutting line 50 may be formed by the plurality of straight lines.

Next, valve membranes according to third and fourth embodiments of the present invention will be described with reference to FIGS. 7 and 8.

The valve membrane 110 according to the embodiment may be distinguished from those of the aforementioned embodiments, in that third cutting lines 60 and fourth cutting lines 70 are provided.

The valve membrane 110 according to the third embodiment may further include the third cutting lines 60. The third cutting lines 60 may extend inwardly in a direction toward the center point O from both ends of the first cutting line 40. The third cutting lines 60 are not connected to the second cutting line 50, but may be positioned on the same line as both ends of the second cutting line 50.

In the valve membrane 110 formed as above, since a connection length L1 between the thin film member 10 and the first opening and closing member 20 is shortened by the third cutting lines 60, the first opening and closing member 20 may be more smoothly moved.

The valve membrane 110 according to the fourth embodiment may further include the third cutting lines 60 and the fourth cutting lines 70. The third cutting lines 60 may extend inwardly from both ends of the first cutting line 40 and the fourth cutting lines 70 may extend outwardly from both ends of the second cutting line 50. Herein, since both ends of the first cutting line 40 and both ends of the second cutting line 50 are formed to be separated from each other by a predetermined interval, the third cutting lines 60 and the fourth cutting lines 70 may not be connected to each other.

In the valve membrane 110 formed as above, since a shaft 16, a rotation reference of the first opening and closing member 20 and the second opening and closing member 30 is formed by the third cutting lines 60 and the fourth cutting lines 70, the first opening and closing member 20 and the second opening and closing member 30 may smoothly rotate.

Next, a valve membrane according to a fifth embodiment of the present invention will be described with reference to FIGS. 9 and 10.

The valve membrane 110 according to the embodiment may be distinguished from those of the aforementioned embodiments in that a plurality of grooves 80 and 90 are provided.

A first groove 80 is formed in a first surface 12 of the thin film member 10 (see FIG. 10) and may connect both ends of the first cutting line 40 to each other. Unlike this, the second groove 90 is formed in a second surface 14 of the thin film member 10 (see FIG. 10) and may connect both ends of the second cutting line 50 to each other. Herein, since the first groove 80 and second groove 90 are formed to have predetermined depths, the first opening and closing member 20 and the second opening and closing member 30 may be more smoothly opened and closed. Therefore, in the embodiment, although the difference in area between the first opening and closing member 20 and the second opening and closing member 30 is decreased, the flow control of the fluid through the opening and closing members 20 and 30 may be controlled.

Next, an opening and closing principle of the valve member according to the present invention will be described with reference to FIGS. 11 and 12.

The valve membrane 110 of the present invention may be installed on a pipe through which the fluid moves and may be selectively opened and closed according to a flow rate of the fluid. Herein, since the first opening and closing member 20 and the second opening and closing member 30 have different areas, force F1 acting on the first opening and closing member 20 and force F2 acting on the second opening and closing member 30 are different from each other at all times, even though uniform pressure acts on the valve membrane 110. Accordingly, the first opening and closing member 20 and the second opening and closing member 30 may have inertia to rotate in one direction (a clockwise direction in FIG. 11) at all times. However, a difference F1–F2 between the force F1 acting on the first opening and closing member 20 and the force F2 acting on the second opening and closing member 30 is not greater than a predetermined reference force (for example, the elastic force of the thin film member 10), the opening and closing members 20 and 30 may be maintained in a closed state (see FIG. 11).

In this state, when the flow rate of the fluid increases and thus, the difference F1–F2 between the force F1 which acting on the first opening and closing member 20 and the force F2 acting on the second opening and closing member 30 are higher than the predetermined reference force, the opening and closing members 20 and 30 may be opened while being rotated as illustrated in FIG. 12.

Meanwhile, in the valve membrane 110 of the present invention, since the opening and closing members 20 and 30 rotate in the vicinity of the center point O of the thin film member 10, the opening and closing members 20 and 30 do not vibrate significantly, and may be opened and closed rapidly according to a change in flow rate of the fluid even in the case that the fluid flows irregularly.

Moreover, in the valve membrane 110 of the present invention, since the opening and closing conditions of the opening and closing members 20 and 30 may be controlled through the areas of the opening and closing members 20 and 30, even a minute flow rate may be controlled.

Next, a check valve according to an embodiment of the present invention will be described with reference to FIGS. 13 through 16.

A check valve 100 according to the embodiment of the present invention may include the valve membrane 110, a first valve body 120, and a second valve body 130. Herein, the valve membrane 110 may be interposed between the first valve body 120 and the second valve body 130. Moreover, the first valve body 120 and the second valve body 130 may be firmly coupled to each other by a screw fastening method.

The valve membrane 110 may be a membrane having elastic force. For example, the valve membrane 110 may be formed of a material which may be bent or deformed when a predetermined degree of force is applied thereto. For reference, since the valve membrane 110 according to the embodiment is the same or similar to the valve membranes illustrated in FIGS. 1 through 12, a detailed description of the valve member 110 will be omitted.

The first valve body 120 may configure one part of the check valve 100. When further explained, the first valve body 120 is coupled to the second valve body 130 to form an overall shape of the check valve 100.

The first valve body 120 may be connected to the second valve body 130 and a further pipe. When further explained, one end of the first valve body 120 is coupled to the second valve body 130 and the other end thereof may be coupled to another pipe. To this end, screw units may be formed on both ends of the first valve body 120.

A first through-hole 122 may be formed in the first valve body 120. When further explained, the first through-hole 122 may be formed in on one end of the first valve body 120, joined with the valve member 110.

The first through-hole 122 may have a shape in which two semicircles are connected to each other. That is, the first through-hole 122 may have a shape in which a semicircle having a third radius R3 and a semicircle having a fourth radius R4 are connected to each other. Herein, the third radius R3 may be larger than the first radius R1 of the first cutting line 40 and the fourth radius R4 may be smaller than the second radius R2 of the second cutting line 50. The first through-hole 122 formed as above may allow the first opening and closing member 20 to rotate forwardly (in a right direction in FIG. 13), but prevent the second opening and closing member 30 from rotating forwardly.

The second valve body 130 may configure a remaining part of the check valve 100. When further explained, the second valve body 130 is coupled to the first valve body 120 to form the overall shape of the check valve 100.

The second valve body 130 may be connected to the first valve body 120 and another pipe. When further explained, one end of the second valve body 130 is coupled to the first valve body 120 and the other end thereof may be coupled to another pipe. To this end, the screw units may be formed on both ends of the second valve body 130.

A second through-hole 132 may be formed in the second valve body 130. When further explained, the second through-hole 132 may be formed in one end of the second valve body 130, joined to the valve member 110.

The second through-hole 132 may have a shape in which two semicircles are connected to each other. That is, the second through-hole 132 may have a shape in which a semicircle having a fifth radius R5 and a semicircle having a sixth radius R6 are connected to each other. Herein, the fifth radius R5 may be smaller than the first radius R1 of the first cutting line 40, but larger than the second radius R2 of the second cutting line 50 and the sixth radius R6 may be larger than the second radius R2 of the second cutting line 50, but smaller than the first radius R1 of the first cutting line 40. The second through-hole 132 formed as above may prevent the first opening and closing member 20 from rotating backwardly, but allow the second opening and closing member 30 to rotate backwardly.

Since the check valve 100 configured as above has a simple structure, the check valve can be easily manufactured. Moreover, since the check valve 100 adopts the valve membrane 110, a minute flow rate can also be controlled.

As set forth above, according to the embodiments of the present invention, the valve membrane and the check valve can be mounted on a small-sized flow controlling device and the flow rate can be minutely controlled.

Since the valve membrane and the check valve have a simple structure, the manufacturing thereof can be facilitated and manufacturing costs thereof can be saved.

While the present invention has been shown and described in connection with the embodiments, it will be apparent to those skilled in the art that modifications and variations can be made without departing from the spirit and scope of the invention as defined by the appended claims.

What is claimed is:

1. A valve membrane, comprising:
a thin film member;
a first opening and closing member formed by a first cutting line to cut one part of the thin film member and opened by a fluid moving in a first direction;
a second opening and closing member formed by a second cutting line to cut another part of the thin film member and closed by the fluid moving in the first direction;
third cutting lines respectively extending inwardly from an end of the first cutting line and another end of the first cutting line;
fourth cutting lines respectively extending outwardly from an end of the second cutting line and another end of the second cutting line; and
a shaft formed by the third cutting lines and the fourth cutting lines and connecting the thin film member with the first opening and closing member and the second opening and closing member.

2. The valve membrane of claim 1, wherein the first cutting line has a length greater than that of the second cutting line.

3. The valve membrane of claim 1, wherein the first cutting line is curved to have a first radius, and
the second cutting line is curved to have a second radius.

4. The valve membrane of claim 3, wherein the first radius and the second radius have different sizes.

5. The valve membrane of claim 1, wherein the third cutting lines and the fourth cutting lines are formed to be parallel.

6. The valve membrane of claim 1, wherein an area of the first opening and closing member is larger than that of the second opening and closing member.

7. The valve membrane of claim 1, wherein the thin film member is formed of an elastic material.

8. A check valve, comprising:
a first valve body;
a second valve body; and
a valve membrane including a first opening and closing member and a second opening and closing member having different areas,
wherein the valve membrane includes:
a thin film member;
the first opening and closing member formed by a first cutting line to cut one part of the thin film member and opened by a fluid moving in a first direction; and
the second opening and closing member formed by a second cutting line to cut the other part of the thin film member and closed by the fluid moving in the first direction;
third cutting lines respectively extending inwardly from an end of the first cutting line and another end of the first cutting line;
fourth cutting lines respectively extending outwardly from an end of the second cutting line and another end of the second cutting line; and
a shaft formed by the third cutting lines and the fourth cutting lines and connecting the thin film member with the first opening and closing member and the second opening and closing member.

9. The check valve of claim 8, wherein the first cutting line is curved to have a first radius, and the second cutting line is curved to have a second radius.

10. The check valve of claim 9, wherein the first radius and the second radius have different sizes.

11. The check valve of claim 10, wherein the first valve body is provided with a first through-hole including a semicircle having a third radius and a semicircle having a fourth radius, and
the second valve body is provided with a second through-hole including a semicircle having a fifth radius and a semicircle having a sixth radius.

12. The check valve of claim 11, wherein the second radius is smaller than the first radius,
the third radius is larger than the first radius,
the fourth radius is smaller than the second radius,
the fifth radius is smaller than the first radius and larger than the second radius, and
the sixth radius is smaller than the first radius and larger than the second radius.

13. The check valve of claim 8, wherein the third cutting lines and the fourth cutting lines are in parallel.

14. The check valve of claim 8, wherein an area of the first opening and closing member is larger than an area of the second opening and closing member.

15. The check valve of claim 8, wherein the thin film member is formed of an elastic material.

* * * * *